(12) United States Patent
Reid

(10) Patent No.: US 6,532,192 B1
(45) Date of Patent: Mar. 11, 2003

(54) SUBSEA POSITIONING SYSTEM AND APPARATUS

(75) Inventor: Ceri St. John Reid, Edinburgh (GB)

(73) Assignee: Coda Technologies Ltd., Aberdeen (GB)

( * ) Notice: Subject to any disclaimer, the term of this patent is extended or adjusted under 35 U.S.C. 154(b) by 0 days.

(21) Appl. No.: 09/720,872

(22) PCT Filed: Jul. 1, 1999

(86) PCT No.: PCT/GB99/02095

§ 371 (c)(1),
(2), (4) Date: Jan. 2, 2001

(87) PCT Pub. No.: WO00/02061

PCT Pub. Date: Jan. 13, 2000

(30) Foreign Application Priority Data

Jul. 1, 1998 (GB) ............................................. 9814093

(51) Int. Cl.[7] .............................. G01S 11/14; G01S 5/22
(52) U.S. Cl. ........................................................ 367/127
(58) Field of Search ................................. 367/2, 6, 127, 367/133

(56) References Cited

U.S. PATENT DOCUMENTS

| | | | |
|---|---|---|---|
| 5,119,341 A | 6/1992 | Youngberg | 367/5 |
| 5,136,613 A | 8/1992 | Dumestre, III | 367/76 |
| 5,579,285 A | * 11/1996 | Hubert | 367/133 |

FOREIGN PATENT DOCUMENTS

FR  2 643 463  8/1990

OTHER PUBLICATIONS

Kwon et al, "Digital Waveform Codings for Ocean Acoustic Telemetry", IEEE Journal of Oceanic Engineering, Jan. 1991, vol. 16, No. 1, pp. 56–65.

Takeuchi, "A Long–Range and High–Resolution Underwater Acoustic Positioning System", Marine Geodesy, Jul.–Dec. 1990, vol. 14, No. 3–4. pp 225–231.

* cited by examiner

Primary Examiner—Daniel T. Pihulic
(74) Attorney, Agent, or Firm—Venable; Norman N. Kunitz

(57) ABSTRACT

The present invention relates to a positioning system for use in underwater/subsea hydrographic surveying and positioning applications The system comprises a submersible having a transponder formed and arranged for communication with a remote receiver. The transponder is formed and arranged to transmit a continuous water propagatable data signal, which signal includes a binary signal sequence, preferably a "gold code", each of the transponder and the receiver being provided with an internal clock. The clock on the receiver and transponder are in substantial synchronisation. The remote receiver is provided with processing means for determining the position of the submersible by calculating the time taken for a signal to be transmitted by the transponder to be received by the remote receiver utilising the clock time of transmittal with respect to the clock time of reception at the remote receiver. Means for determining clock variation and resynchronising the clocks is described.

13 Claims, 1 Drawing Sheet

SUBSEA POSITIONING SYSTEM AND APPARATUS

BACKGROUND OF THE INVENTION

The present invention relates to a subsea positioning system and apparatus suitable for use in a hydrographic survey system.

Hydrographic surveys on subsea conditions require the accurate positioning of underwater bodies to be determined—the body may be a 'towfish' (for sidescan, sub-bottom profiler, swathe bathymetry or magnetometer measurements, for example) or a towed cable or 'streamer' (for seismic investigations), an ROV (remotely operated vehicle), manned submersible, or an object placed on the seabed (cables placed on the seabed for seismic investigations, LBL beacons, the data recorders of downed aircraft). If the position of a sensor is not accurately known, its measurements may be of little use; if the exact position of an aircraft's 'black box' cannot be determined, then it cannot be recovered.

The conventional way of determining the position of a body is to use a sonar beacon attached to the body, which allows a surface vessel to determine the position of the beacon (and thus the body) relative to the vessel. In the case of the surface vessel, the adoption of satellite positioning using the global positioning system (GPS) and differential GPS, has largely overcome the problem associated in identifying position of the towing vessel on the surface. As the surface vessel can be positioned to within 10 meters or less using GPS, Differential GPS or RTK (real-time kinematic) GPS, the accuracy of the underwater body's position relative to the surface vessel will determine the overall accuracy with which the object's geodetic position can be determined. In the example of the towfish the sensor produces data which allows the position of a seabed feature relative to the towfish to, be determined with high accuracy (within centimeters). Using the two relative positions—the towfish relative to the vessel, and the seabed feature relative to the towfish—the feature position can be converted into an absolute geodetic position (i.e. a position on a nautical chart).

As the radio signals used for GPS do not propagate through water then the problems in positioning accurately an object or towfish become significantly more complex. It is known therefore to use an ultra short baseline (USBL) sonar system and method of determining the object or towfish position. Other known systems are long baseline sonar system (LBL) and short basic line (SBL) and all such systems work on a very similar principle.

USBL uses sonar signals in the frequency range of from 7 to 70 kHz to determine the position of a beacon or towfish. A "ping" signal is emitted from a transducer on the beacon or towfish and received by three or more receivers or hydrophones suspended in the water below the towing vessel on the surface. By calculating the difference in arrival time of the signal at each receiver it is possible to determine by triangulation the azimuth and elevation of the towfish relative to the towing vessel (a typical sonar survey conf iguration is shown in FIG. 1 and is described further below). Using the information that the beacon or towfish transponder's ping signal is generated as a result of receiving a ping from the towing vessel, or as a result of an electrical signal sent down the tow cable (if one is used), it is possible to work out the delay between the ping signal being sent from the beacon or towfish and its reception at the towing vessel's receivers. This time difference can be converted into a distance using the known velocity of sound in water.

By way of example a conventional sonar survey system and configuration is shown in FIG. 1 and is described below. The system, generally indicated by reference number 1, comprises a subsea towfish 2 towed via a tow cable 4 by a towing vessel 6 on the surface of the sea 8. The tow fish comprises—an acoustic beacon 10, which is either integral with or attached to the towfish, and is capable of operating at frequencies in the range of 7–70 kHz. Two different methods can be used to cause the towfish to generate a ping: transponder mode, in which the ping is generated as the result of receiving a ping from the towing vessel; and responder mode, where the ping is generated as a result of an electrical signal sent down the tow cable.

The towing vessel—has a receiver group of hydrophones 12 (usually three or five), built into a single receiving unit which is pole mounted (either using a through-hull or overside mount), so that the hydrophones are in undisturbed water below the vessel's hull. The signals from the receiver unit are fed to a processing unit within the vessel which performs all the signal processing necessary to determine the range and angle to the towfish beacon and formats this data so that it can be output to other navigational equipment. The receiver unit is capable of generating a ping so that the towfish beacon can operate in transponder mode.

In a USBL system and in order to be able to calculate the angular measurements, the ping from the beacon on a towfish, for example, is received by the towing vessel in an array of three or more hydrophones, mounted such that they can determine the azimuth and elevation of the towfish by triangulation (e.g. three hydrophones in an equilateral triangle); this is done by placing the hydrophones within half a wavelength of each other, allowing the angle to the towfish to be determined by measuring the difference in the path length travelled by the ping to reach each hydrophone (calculated from the difference in arrival time, or phase of the ping at each hydrophone); this can readily be converted into an angle relative to the receiver plane.

In all acoustic positioning systems (USBL, SBL, LBL, etc.) the range of the towfish from the towing vessel is determined by measuring the time taken for the ping to travel from the towfish to the vessel (as the speed of sound in water is known, the propagation time can easily be converted into a distance).

SBL and LBL systems establish the angular measurements of the beacon by using multiple receivers, usually placed on the seabed at the edges of the working area (so that the beacon is within the boundary of the area defined by the receivers), which receive the ping from the beacon and transmit the time of arrival of that ping to the surface vessel. The equipment on the surface vessel calculates a 3D position for the beacon using the propagation time of the ping from the beacon to each of the subsea receivers; the receiver on the surface vessel may also be used to obtain a range to the beacon and thus help determine its position.

For both transponder and responder mode, the number of range measurements which can be made in a given period is limited by the range of the towfish from the vessel because it is dependent upon the propagation time of the ping through the water. In transponder mode the maximum number of range measurements which can be made per second is $1500/(2 \times \text{range in meters})$—typically one or two per second. In responder mode the maximum is $1500/(\text{range in meters})$, allowing twice the number of ranges to be obtained as for a transponder.

Conventional underwater positioning systems such as LBL, SBL and USBL have limitations which arise from the low update rate due to the long time intervals between "pings" and an inability to discriminate between the signal coming directly from the beacon or towfish and one which has bounced off the sea floor, the sea surface or any other sea structure such as rock or a ship wreck etc.—"multipath" signals. The low update rate and the inability to discriminate reduce the accuracy in positioning a beacon or towfish at any given time.

The determination of an object or a towfish position relative to the vessel on the surface by acoustic positioning is almost always the "weakest link" in the positioning chain, and is the source of most of the inaccuracies in feature positioning in surveys.

A cheaper and more accurate subsea positioning equipment would be desirable due to the expense, complexity and inaccuracy of known acoustic positioning systems.

SUMMARY OF THE INVENTION

It is an object of the present invention to avoid or minimise one or more of the foregoing disadvantages.

The present invention provides a positioning system suitable for use in underwater/subsea hydrographic surveying applications which system comprises a submersible having a transponder means formed and arranged for communication with a remote receiver means, characterized in that said transponder means is formed and arranged to transmit a continuous water propagatable data signal, which signal includes a binary signal sequence, each of said transponder means and said remote receiver means being provided with clock means, both said clock means being in substantial synchronisation; said remote receiver means being provided with processing means for determining the position of said submersible by calculating the time taken for a signal to be transmitted by said transponder means to be received by said remote receiver means utilising the clock time of transmittal with respect of the clock time of reception at said remote receiver means.

Thus with a positioning system according to the present invention a multiplicity of position updates per second may be obtained giving a significantly improved accuracy of positioning and with improved immunity to multipath or background noise.

Preferably said water propagatable data signal is a sonar signal having a frequency range from 10–70 kHz, preferably 25–35 kHz, for example 30 kHz giving a wavelength in water of 2.5 cm. It will be -understood though that where a very high degree of accuracy is required it is preferred to use a higher frequency, for example 30 kHz and where it is required for a signal to propagate over a longer range then a lower frequency, such as for example, 10 kHz, may be used allowing satisfactory operation over longer ranges Preferably said binary data signal sequence or binary data stream is encoded into said continuous data signal and is transmitted by one of several methods of modulation of the submersible's transponder means for example Frequency Shift Keying (FSK); Phase Shift Keying (PSK); Minimum Shift Keying (MSK); or Multiple Frequency Shift Keying (MFSK).

Most preferably said binary data signal sequence or stream consists of a "gold code". A "gold code" is a binary sequence which is derived by modulo-2 addition of two maximal linear codes—allowing different codes in a family to be synthesised by simply changing the phase relationship (i.e. bit off-set) between the codes. A maximal linear code is a binary sequence for which a given number of code-generating bits use all the possible combinations of these bits (e.g. if two bits were used the maximal linear code would use the sequence 00, 01, 11, and 10). Such maximal linear codes have a low auto-correlation except where the phase difference or bit off-set is zero. Gold codes are non maximal linear codes—that is that they do not use all possible combinations of a given number of bits and have somewhat less good auto-and cross-correlation properties than maximal linear codes. For any given code in the family, the maximum possible cross-correlation (representing the chances of mistaking one code for another in an environment with a back ground noise with any other code) is limited. For example for a code of length 2047 bits the cross-correlation is 30 dB less than the auto-correlation of the code (i.e. the auto-correlation is about 31 times stronger than the cross-correlation).

Preferably in order to be able to have a range of up to 10 km using a binary signal sequence it is necessary for the sequence not to repeat itself within that 10 km distance (or about 7 seconds at the speed of sound in water of 1500 m per second). Preferably the data rate of the transmission is in the region of 20–300 bits per second (bps) for example 200 bps and thus there would be required a code length of at least 1400 bits (200×7).

Preferably there is used a higher data rate as this will give a greater number of submersible positions per second thereby allowing a more accurate submersible positioning to be determined. Whilst a higher data rate is preferred it does require a longer binary code for a given range, but a longer code has the advantage that it has greater noise immunity than a short one. i.e. it is less likely that the remote receiver means will incorrectly identify an incoming noise signal as being the expected code.

Preferably where a higher positioning accuracy is required there is used a longer code/higher data rate and where an extended operating range is required and thus less accurate positioning there is used a shorter code and lower data rate for example a 20 bps data rate would require a 140 bit code to give a 10 km range.

Although it may be preferable to use a longer code sequence (to return a unique position, and to give higher noise immunity), longer codes have the disadvantage that the time taken to 'lock on' to the code initially will be proportional to the code length—that is, it will take longer for a longer code. If this represents a difficulty, then the code length can be reduced so that the position is non-unique (i.e. the code sequence repeats more than once over the range being measured), but external information sources (last known position of the submersible, and the speed that the transponder means and said remote receiver means travel through the water, for example) can be used to determine an accurate and correct position for the transponder means relative to the remote receiver means on a vessel, for example, on the surface of the water.

Preferably said remote receiver mean and said transponder means are generally similar those known in the art.

Preferably said clock means is in the form of at least one oven-controlled oscillator device having an output with a drift of preferably less than 4 parts per billion. Alternatively said clock means is in the form of a clock pulse, pulsed down the tow cable. It will be appreciated that in practice it is very difficult to achieve absolute synchronisation between said clock means and thus there are provided means to re-synchronise the clock means on the said transponder means and said remote receiver means. For example if there was used an oscillator operating with a drift of 2 ppb the drift over an hour will be 7.2 microseconds. If two oscillators were used, one on the transponder means and one on the remote receiver means, then the combined drift would be 14.4 microseconds corresponding to a error in positioning due to clock shift or drift of 2.25 cm per hour of operation.

Preferred means of re-synchronising the clock means on said transponder means and said remote receiver means involves the method of sending out a "ping" signal from said transponder means; recording the time that it was sent; receiving the ping at the remote receiver means after a time delay determined by the range or spacing apart of the remote receiver means and transponder means and encoding the time of arrival of the "ping" into the bit stream sent to the transponder means As the range over which the ping was sent is known then the time at which the remote receiver means receives the ping can be used to indicate the difference in time between the clock means on the remote receiver means and the clock means on the transponder means.

In more detail, a ping is sent from the receiver means (on a surface vessel for example), and received at the transponder means (i.e. opposite to the usual direction of data flow). The receiver logs and "remembers" when it sent the ping, and the transponder means measures the time of arrival of the ping using its internal clock. It then encodes the arrival time of the ping into its bit stream (continuously being sent to the receiver means on the surface vessel for example). The receiver means then has the send time of the ping (using its own clock), and the arrival time of the ping at the transponder means (using the transponder mean's clock), along with range information derived as normal from the continuous data stream. Over a period of time, the receiver means can compare the ranges obtained from the continuous data stream from the transponder means with those determined by the transmission times of receiver means pings and their arrival times at the transponder. A trend in disparity between the ranges determined by these means indicates the drift of the transponder clock relative to the receiver clock; the receiver clock can then work out a compensation time to be added or subtracted to its own clock which will re-synchronise it with the transponder clock. Using this mechanism, the system can compensate for clocks which are less than perfect, and the required accuracy of the receiver and transponder clocks is reduced; the requirement becomes that their combined drift should be such that a sufficient number of receiver pings can be transmitted and received by the transponder, that the drift tendency of the clocks can be accurately statistically assessed.

In a system where several receivers are used (corresponding to the SBL or LBL case), each receiver would have to send a ping independently to the beacon, to allow the clock drift of the transponder relative to that particular receiver to be measured. This means that either each receiver has to send an identifiable ping (one which had its address encoded in it using FSK, PSK, MSK, MFSK or some similar mechanism), or each receiver would have to send its ping at a predefined time (e.g. if there were four receivers, each might send a ping once every four seconds; the first receiver using the seconds 0, 4, 8 . . . in a given minute, the second receiver using the seconds 1, 5, 9, . . . and so on). This mechanism can also be used to resolve non-unique positions derived from codes which repeat over the propagation distance from the transponder to the receiver, as the arrival time of the receiver ping at the transponder uniquely defines the range of the receiver from the transponder.

Preferably said remote receiver means and/or said transponder means are provided with filtering means formed and arranged to remove background noise.

Preferably where said transponder means is powered by an internal power source such as, for example, a battery and to allow for a longer battery life it is preferred to generate a less powerful signal. For example a signal strength of 20 or 30 dB less than that of conventional transponder means/beacons would produce position information at least equal in quality to current acoustic positioning systems (such as USBL) whilst operating on a signal strength of 3% to 10% of that required by conventional USBL systems. Alternatively by using a signal strength comparable to conventional USBL systems it is possible to achieve ranges 3–5 times greater in range than that obtainable with conventional USBL systems whilst maintaining accuracy.

In some applications, it is necessary to use several transponder means and preferably there are provided a plurality of transponder means, each operating using the same frequency but each having a different binary signal sequence or gold code thereby allowing the signals from each transponder means to be tracked and processed independently

BRIEF DESCRIPTION OF THE DRAWING

Further preferred features and advantages of the present invention will appear from the following detailed description given by way of an example of a preferred embodiment illustrated with the reference to the accompanying drawings in which.

DESCRIPTION OF THE PREFERRED EMBODIMENTS

Figure 2:
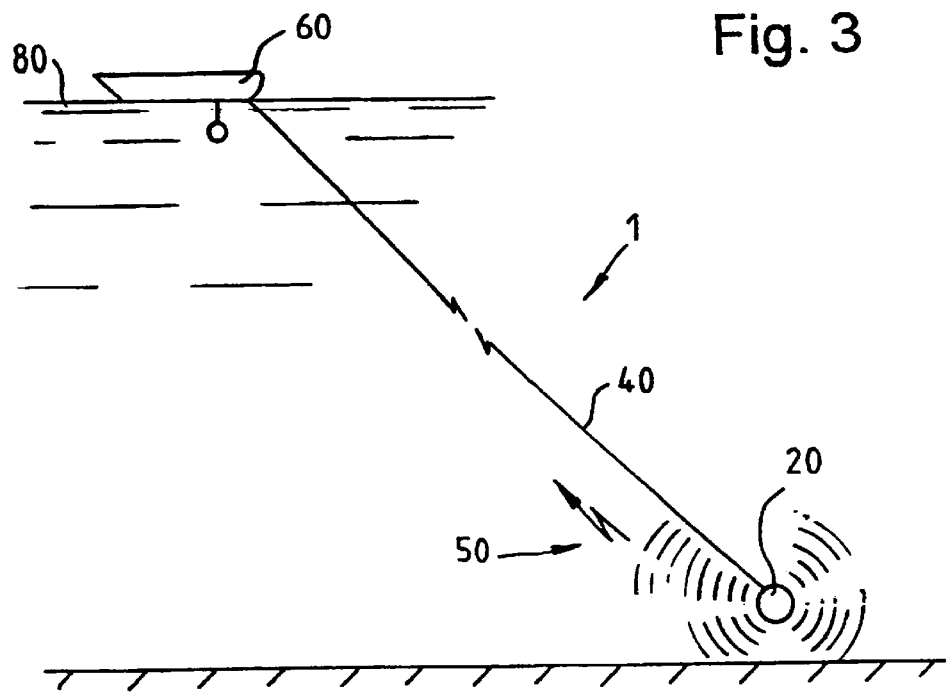
FIG. 2 is a schematic diagram of a sonar survey configuration generally similar to that described above with respect to FIG. 1.

In more detail a subsea positioning system, generally indicated by reference number 10, is shown in FIG. 2. The system 10 corresponding to a USBL system comprises a subsea tow fish 20 towed by a tow cable 40 by a towing vessel 60 on the surface of the sea 80. The tow fish 20 comprises a transponder and a clock (not shown). The towing vessel 60 has a receiver and a clock. The. clock on the tow fish 20 and the clock on the receiving unit on the towing vessel 60 are in substantial synchronisation. The receiver on the towing vessel is provided with processing apparatus for determining the range and angle of the tow fish by calculating the time taken for a signal sent by the transponder to be received by the receiver on the tow ship 60. The signal 50, which is a continuous water propagatable data signal including a binary signal sequence or gold code, is transmitted at a frequency of 30 kHz (wavelength 2.5 cm) and this signal is received by the receiver on the tow ship. When the signal is received, there is received also the binary signal sequence which includes details about the time at which the signal was transmitted and thus by calculating the time taken for the signal to be transmitted by the transponder and for it to be received by the receiver utilising the clock time of the transmittal with respect to the clock time of reception at the receiver it is possible to calculate accurately the position of the tow fish with respect to the tow ship. As the position of the tow ship can be calculated very accurately using the aforementioned global positioning systems the position of a feature on the seabed may be given a geodetic position on a nautical chart.

Figure 1:
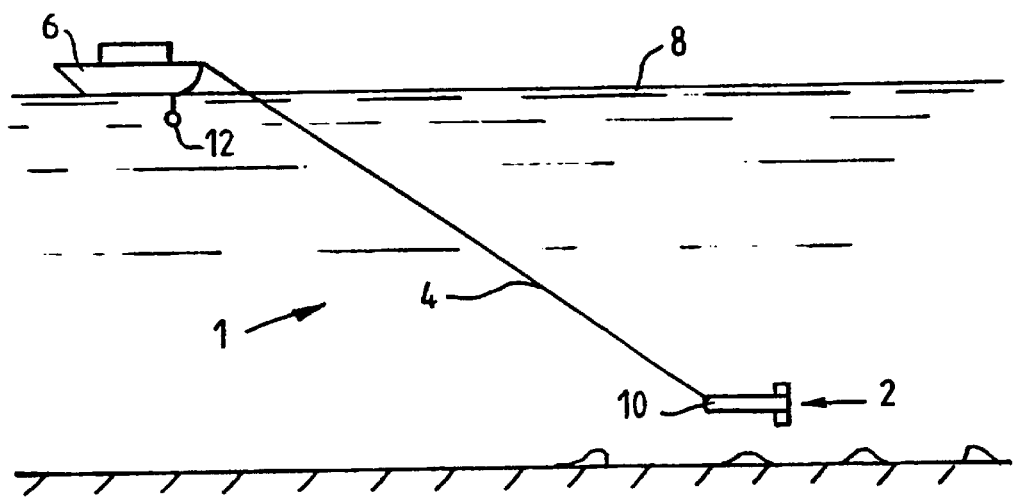
FIG. 1 is a schematic diagram of a conventional sonar survey configuration.
Figure 3:
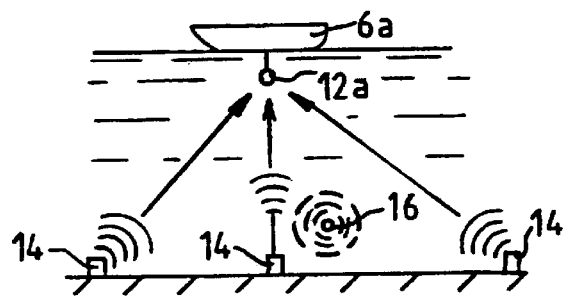
FIG. 3 is a schematic diagram of a second embodiment of subsea positioning system according to the invention.

A more detailed description of a subsea positioning system, corresponding to an SBL or LBL system follows with reference to FIG. 3. The system comprises a surface vessel 6a (with a receiver 12a), several subsea receivers 14 and a subsea object 16 (whose position it is required to determine), which carries a beacon comprising a transponder and a clock. Using a similar mechanism to that described above and with reference to FIG. 2, each receiver (whetheron the surface vessel, or on the seabed) receives the binary data stream from the beacon attached to the object. Each receiver can determine the distance from itself to the beacon (using the mechanism already described), and is able to transmit that data to the surface vessel using conventional communications means (binary communication using FSK, MSK, PSK, MPSK or some other modulation mechanism). The surface vessel then combines the ranges from the subsea receivers (and its own receiver) to determine accurately the position of the beacon and therefore the object. It is also possible that a synchronous communications system—like that between the beacon and the receivers—might be used between the seabed receivers and the surface vessel.

Due to the superior angular resolution of this system relative to conventional SBL and LBL systems, it is possible to use fewer subsea receivers to achieve a given accuracy of position. This is because it uses the continuous bit stream's rising and falling edges to allow waveforms to be uniquely identified. Thus independent measurements of angle can be made between two receivers at a far larger distance (meters, tens of meters, or more) than those used in a USBL system (rather less than 1 meter spacing). The lengthened base line allows the angle to the beacon to be derived more accurately than the shorter base line of a USBL system allows. In effect, the receivers of a SBL or LBL system can between them derive accurate angular measurements; this allows a ship-mounted system to use two, three or more widely spaced receivers and determine the angular position of the beacon with great accuracy.

An example of a suitable clock is an oven-controlled oscillator device for example the Piezo Technologies model no. X05019 which has a 3 Mhz output with a drift four (4) parts per billion. An example of a suitable transponder is that made by Applied Acoustics Ltd of Great Yarmouth and an example of a suitable receiver is the ORE Trackpoint II receiver sold by Geo Acoustics of Great Yarmouth UK.

Various modifications may be made to the above described embodiment without departing from the scope of the present invention. Thus for example, there may be provided a plurality of transponders on the tow fish, or on several subsea objects each operating using the same frequency but having a different binary signal sequence or gold code thereby allowing the signals from each transponder to be tracked and processed independently.

What is claimed is:

1. A positioning system for use in underwater/subsea hydrographic surveying applications which system comprises a submersible having a transponder means formed and arranged for communication with a remote receiver means, said transponder means and said remote receiver means being provided with clock means, both said clock means being in substantial synchronisation; said remote receiver means being provided with processing means for determining the position of said submersible by calculating the time taken for a signal to be transmitted by said transponder means to be received by said remote receiver means utilising the clock time of transmittal with respect of; the clock time of reception at the said remote receiver means, and wherein said transponder means is formed and arranged to transmit a continuous water propagatable data signal, which signal includes a binary signal sequence, which signal sequence has a length at least equal to the propagation time of the signal over a desired given measuring range such that said signal sequence does not repeat itself.

2. A positioning system as claimed in claim 1 wherein said binary data signal sequence or binary data stream is encoded into said continuous data signal and is transmitted by one of the following methods of modulation—Frequency Shift Keying; Phase Shift Keying; Minimum Shift Keying; or Multiple Frequency Shift Keying.

3. A positioning system as claimed in claim 1 wherein said binary data signal sequence consists of a "gold code" as defined herein.

4. A positioning system as claimed in claim 1 wherein said binary signal sequence has a data rate of transmission in the region of from 20 to 300 bits per second.

5. A positioning system as claimed in claim 1 wherein said water propagatable data signal is a sonar signal having a frequency range of from 10 to 70 kHz.

6. A positioning system as claimed in claim 5 wherein said sonar signal has a frequency range of from 25 to 35 kHz.

7. A positioning system as claimed in claim 5 wherein said sonar signal has a frequency of 30 kHz giving a wavelength in water of 2.5 cm.

8. A positioning system as claimed in claim 1 wherein said clock means is in the form of at least one oven-controlled oscillator device having an output with a drift of less than four parts per billion.

9. A positioning system as claimed in claim 1 wherein said clock means is in the form of a pulse, pulsed down a long tow cable.

10. A positioning system as claimed in claim 1 wherein there is provided means of resynchronising said clock means on said transponder means and said remote receiver means which involves the method steps of sending out a "ping" signal from said transponder means; recording the time at which the said ping signal was sent; receiving the ping signal at the remote receiver means after a delay time determined by the range or spacing apart of the remote receiver means and transponder means and encoding the time of arrival of the "ping" into said binary signal sequence sent to said transponder means; and calculating the time at which the remote receiver means receives the "ping" to indicate the difference in time between the clock means on said remote receiver means and the clock means on said transponder means.

11. A positioning system as claimed in claim 1 wherein there are provided a plurality of said remote receiver means, each of said receiver means being spaced apart from other said receiver means and being formed and arranged to send a signal at a predetermined time not corresponding to the predetermined time of the transmission of a signal by the other spaced apart receiver means.

12. A positioning system as claimed claim 1 wherein said remote receiver means and/or said transponder means are provided with filtering means formed and arranged to remove background noise.

13. A positioning system as claimed in claim 1 wherein there is provided a plurality of transponder means, each operating using the same frequency but each having a different binary signal sequence.

* * * * *